United States Patent
Mani et al.

(10) Patent No.: US 10,498,538 B2
(45) Date of Patent: Dec. 3, 2019

(54) TIME-BOUND SECURE ACCESS

(71) Applicant: Amazon Technologies, Inc., Seattle, WA (US)

(72) Inventors: Kaushik Mani, Seattle, WA (US); Balarajan Balasubramaniam, San Jose, CA (US); Carl Haverl, Aptos, CA (US); Prakash Krishnamurthy, Sammamish, WA (US); Ahmet Musabeyoglu, Sunnyvale, CA (US); Peeyush Champalal Nahar, Sammamish, WA (US); Dushyant Rao Chegoori, Santa Clara, CA (US); Hoshgeldy Tachmuradov, Soquel, CA (US); Ziyi Zhang, Mountain View, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/714,956

(22) Filed: Sep. 25, 2017

(65) Prior Publication Data
US 2019/0253255 A1    Aug. 15, 2019

(51) Int. Cl.
*H04L 9/32* (2006.01)
*H04L 29/06* (2006.01)
(Continued)

(52) U.S. Cl.
CPC ........ *H04L 9/3247* (2013.01); *H04L 63/0807* (2013.01); *H04L 63/10* (2013.01)

(58) Field of Classification Search
CPC .... H04L 9/3247; H04L 63/0807; H04L 63/10
See application file for complete search history.

(56) References Cited

U.S. PATENT DOCUMENTS 5,194,855 A    3/1993    McCaslin et al.
6,243,577 B1   6/2001    Elrefaie et al.
(Continued)

FOREIGN PATENT DOCUMENTS

JP    0660100      4/1994
JP    2002183563   6/2002
(Continued)

OTHER PUBLICATIONS

U.S. Appl. No. 15/916,103, filed Mar. 8, 2018, Titled: Integrated Access Control System.
(Continued)

*Primary Examiner* — Techane Gergiso
(74) *Attorney, Agent, or Firm* — Kilpatrick Townsend & Stockton LLP

(57) ABSTRACT

Described herein is a system and universal access control device that may enable a user device to gain access to a secure area or resource during a particular time duration. In some embodiments, a user device may relay a received access token to the universal access device via a wireless transmission at a particular time. The universal access device may verify the authenticity of the access token by relaying the access token information to the remote server, which may authenticate the user device and verify that the user device is permitted access at the particular time. Upon authentication and verification, the user may gain entry to the secure area.

22 Claims, 13 Drawing Sheets

(51) Int. Cl.
*G07C 9/00* (2006.01)
*H04L 29/08* (2006.01)
*G07B 15/04* (2006.01)

(56) References Cited

U.S. PATENT DOCUMENTS

| | | | |
|---|---|---|---|
| 8,237,570 B1 | 8/2012 | Parekh | |
| 8,443,425 B1 | 5/2013 | Evans et al. | |
| 9,805,370 B1* | 10/2017 | Quigley | G06Q 20/4014 |
| 2003/0227220 A1 | 12/2003 | Biskup et al. | |
| 2007/0030122 A1* | 2/2007 | Rickrode | B60R 25/24 |
| | | | 340/5.72 |
| 2007/0043954 A1 | 2/2007 | Fox | |
| 2010/0145737 A1* | 6/2010 | Joao | G06Q 20/10 |
| | | | 705/4 |
| 2011/0029777 A1 | 2/2011 | Murakami et al. | |
| 2012/0066757 A1* | 3/2012 | Vysogorets | G06F 21/34 |
| | | | 726/9 |
| 2012/0237028 A1 | 9/2012 | Khazan et al. | |
| 2013/0214901 A1 | 8/2013 | Pineau et al. | |
| 2014/0282929 A1 | 9/2014 | Tse | |
| 2015/0170448 A1 | 6/2015 | Robfogel et al. | |
| 2015/0199863 A1 | 7/2015 | Scoggins et al. | |
| 2015/0221147 A1 | 8/2015 | Daniel-Wayman et al. | |
| 2015/0278548 A1 | 10/2015 | Brands | |
| 2015/0302409 A1* | 10/2015 | Malek | G06Q 20/3224 |
| | | | 705/44 |
| 2016/0127931 A1* | 5/2016 | Baxley | G06F 16/285 |
| | | | 455/67.16 |
| 2016/0156604 A1 | 6/2016 | Oh | |
| 2017/0039790 A1 | 2/2017 | Roy | |
| 2017/0124792 A1 | 5/2017 | Schoenfelder et al. | |
| 2017/0195322 A1 | 7/2017 | Cho et al. | |
| 2017/0236193 A1 | 8/2017 | Zundel et al. | |
| 2017/0270728 A1 | 9/2017 | Troesch et al. | |
| 2018/0007041 A1 | 1/2018 | Davis et al. | |
| 2018/0060989 A1* | 3/2018 | Hietanen | G01C 21/3423 |
| 2018/0083955 A1 | 3/2018 | Tuli et al. | |
| 2018/0350170 A1 | 12/2018 | Wang et al. | |

FOREIGN PATENT DOCUMENTS

| | | |
|---|---|---|
| JP | 2006117099 | 5/2006 |
| JP | 2006172357 | 6/2006 |
| JP | 2013045278 | 3/2013 |
| JP | 2014134881 | 7/2014 |
| WO | 2018213090 | 11/2018 |

OTHER PUBLICATIONS

U.S. Appl. No. 15/595,840, filed May 15, 2017, Titled: Universal Access Control Device.
JP2018178739, "Office Action", dated Jul. 29, 2019, 15 pages.

* cited by examiner

TIME-BOUND SECURE ACCESS

BACKGROUND

As used herein, the term "physical access control" or just "access control" refers to the practice of restricting access or entrance to a secure area or physical resource to authorized persons. There are a number of access control systems available to restrict access to secure areas and/or resources. Access to some of these secure areas and/or resources may be gained by presenting an access device appropriate to each access control system. For example, access may be restricted to users with a correct, physical key that opens a physical lock. In some buildings, access may be enabled through the use of an access card that a user can swipe at an access control unit that is affixed to a building. However, limited options are available for users to access the building without a physical key or entry card.

Recent developments have permitted users to access locations based on sharing data, like PINs (personal identification numbers). For example, the user may be granted access to the location by receiving a PIN from a source that has knowledge of the correct PIN. The user may type the PIN into a keypad of the access control unit affixed to the building. However, receiving this PIN can compromise access control when the building is located in a densely populated area or the access control unit is located underground in an area without network access. For example, it may be that the user must receive the PIN prior to arriving at the building, because the user is unable to receive network communications that include the PIN. In some examples, the user may be forced to use less secure methods of maintaining the PIN for the particular building prior to arriving at the access control unit for the building, like writing the PIN on a piece of paper, which can lead to unauthorized access.

Thus, improved methods of granting access to a location and maintaining security of the access methods is needed. Embodiments of the invention address these and other problems, individually and collectively.

BRIEF DESCRIPTION OF THE DRAWINGS

Various embodiments in accordance with the present disclosure will be described with reference to the drawings, in which.

DETAILED DESCRIPTION

Figure 1:
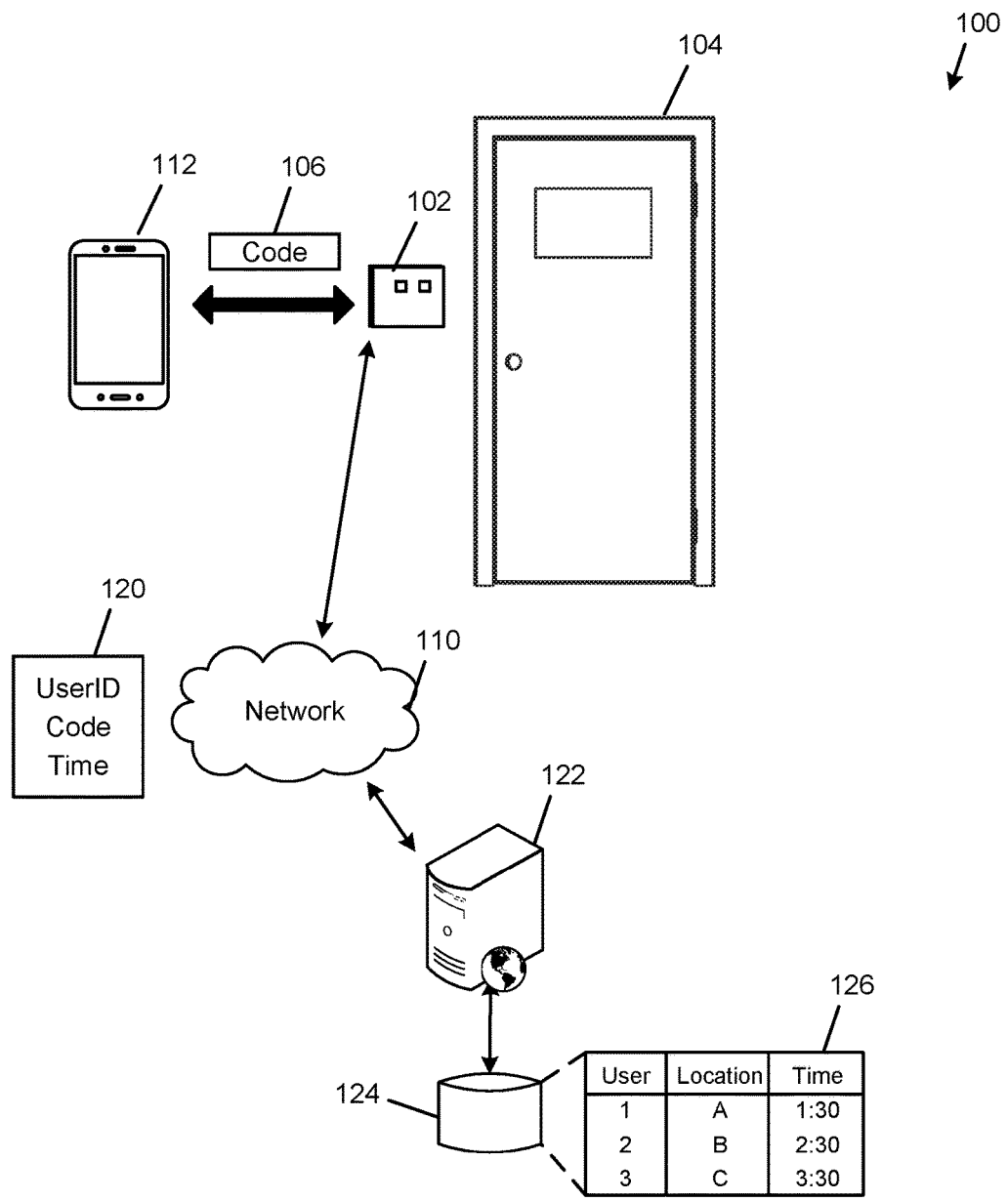
FIG. 1 illustrates a sample system configured to provide access to a location, according to an embodiment of the disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, systems and methods for providing time-bound secure access. For example, a computing device may receive a first request to obtain access to a physical location during a time range. The first request may be generated by a network document accessible via a first communication protocol (e.g., Internet protocol, etc.) and received at a remote server. The first request may comprise data fields of various types having various values corresponding with secure access to the location described throughout the disclosure. The first request may be received at a first time and comprise a digital signature from the a user device. The computing device may generate a token associated with a user device and store the token at a data store at the computing device based at least in part on the first request. The token may be transmitted and stored at the user device. The digital signature and token may comprise, for example, a cryptographic signature and a cryptographic token based at least in part on public-key or asymmetric cryptography. The user device and computing device may generate a one-way hash of electronic data to be signed by the token in order to generate the digital signature. At a second time the computing device can receive a second request to obtain access to the location. The second request may be initiated via a second communication protocol (e.g., Bluetooth, etc.) between the user device and an access control unit and the access control unit may transmit the request (or generate a new request) for the computing device. The second request may comprise the digital signature from the user device that was generated by electronically signing the second request using the token stored at the user device. Upon authenticating the digital signature using a similar signing process at the computing device using the locally stored token and public-key or asymmetric cryptography, access to the location may be granted for the user device corresponding with the approved time range requested.

In a sample illustration, a user device may access a network page that accepts requests to access a building during particular time periods. The user device may interact with the network page to request access to the building and transmit their order to the remote computing device. In response, the remote computing device may generate a confirmation receipt, which may confirm that access to the building will be granted during the time requested and may also transmit a token to the user device that corresponds with the building, the user device, and the particular time period. In some examples, data may also be stored at a data store associated with the remote computing device and the token may comprise a string of characters that may not be parsed to decode information associated with the building, the user device, and the particular time. At a second time, the user may arrive at the building with the token stored locally on their user device. The user device can generate a digital signature using the stored token and may communicate via a first protocol (e.g., Bluetooth, etc.) to transmit the digital signature to an access control unit associated with the building. The access control unit may transmit the digital signature to the remote computing device via a second protocol (e.g., an internet protocol, Hypertext Transfer Protocol (HTTP), HTTP within a connection encrypted by Transport Layer Security or Secure Sockets Layer (HTTPS), etc.) to confirm authentication of the user. In some examples, the remote computing device may decode the digital signature using a locally stored token. When the received digital signature that corresponds with the token at the user device matches the digital signature that corresponds with a token stored at the remote computing device, the user device may be authenticated. In some examples, the timing of the request may also be compared with the time requested in the original request for access to confirm that the user device is accessing the building during the approved time. The remote computing device may transmit a confirmation of authentication and access to the building may be approved. The access control unit may unlock the door or other access point for the user device.

In another sample illustration, a user device may access a network page that accepts requests to access a parking spot during a particular time period. The user device may interact with the network page to request a reservation to use the parking spot. The user may provide payment or other information to initiate a transaction for the access and may also request a particular time to access the parking spot. As shown in the previous illustration, the remote computing device may transmit a token to the user device which the user device may provide to access the parking spot during the particular time period. In another example, the remote computing device may provide a confirmation of the reservation to a parking device that is checked by a parking enforcement officer that monitors the parking spot periodically. A similar process may continue, where the user may generate a digital signature to transmit to an access control unit of a secured area, which is transferred to the remote computing device. The remote computing device may decode the digital signature using a locally stored token. When the received digital signature that corresponds with the token at the user device matches the digital signature that corresponds with the token stored at the remote computing device, the user device may be authenticated. The timing of the request may also be compared and confirmed to correspond with the reservation.

Embodiments of the disclosure provide several technical advantages over other systems. For example, a user device may store multiple tokens that may provide access to a user during particular times without a requirement for the user to have access to a network. The user may receive a confirmation of a reservation or transaction prior to the time that the user attempts to access the location. Especially in locations that have limited network accessibility, such as an underground location and in densely populated areas, the ability to store multiple tokens locally at a user device while also confirming authentication during a limited time frame is beneficial. Security for the building may be maintained by limiting the time period for access (e.g., for delivery drivers, guests of residents of the building, etc.) and network communications that are limited by network constraints may be transmitted through other means.

FIG. 1 illustrates a sample system configured to provide access to a location, according to an embodiment of the disclosure. In illustration 100, an access control reader 102 may be used to control access to an access control point 104. The access control reader 102 may be configured to respond to an access credential 106. The access control reader 102 may be configured to receive a wireless communication from a user device 112 and cause the access control system to allow access to the access control point 104.

In some embodiments, access control reader 102 may be any suitable electronic device capable of receiving an access credential 106 and either granting or denying access to an access control point 104 based on the received access credential 106. When access credential 106 is presented to an access control reader 102 (e.g., via an access credential 106 via a first network connection), the access control reader 102 sends information indicating the credential to a remote server 122 via a second network 110.

In some embodiments, access control reader 102 may transmit a received digital signature 120 from user device 112 via the second network 110. The digital signature 120 may correspond with a user identifier of the user device 112, a code associated with access control reader 102, and/or a time range. The digital signature 120 may be device-specific or device-bound, for example, by correlating the digital signature with an identifier of the user device 112. The cryptographic hash function may correspond with a public hash function, but may enable generation of a device-specific digital signature through the use of a device-specific token. The digital signature may be unique for the user device because, in some examples, the token is unique for a particular user device 112. The user identifier or token may identify user device 112. The time may correspond with the request when the user device requests to access the access control point 104.

The remote server 122 accesses data store 124 that comprises stored tokens 126 associated with various user devices. The remote server 122 may generate a credential using a stored token. For example, user device 112 and remote server 122 may both execute a credential generation module that is stored locally at each device. The credential generation module may use a locally-stored token at each device to generate the credential. For example, using the token stored at the remote server 122, a first credential may be generated, and using the token stored at the user device 112, a second credential may be generated. The first credential and the second credential may be compared, the user device may be authenticated, and access may be granted when the credentials match. In some examples, the credential generation module may use a hash function to generate the credential. Any suitable cryptographic hash function may be utilized.

In some embodiments, the remote server 122 compares the generated credential to the received credential and grants or denies the presented request based on that comparison. If access is denied, the access control point 104 remains inaccessible. If there is a match between the access credential 106 and an entry in a data store associated with the remote server 122, the remote server 122 operates a relay that in turn grants access to the access control point 104. In some embodiments, the processor device may also ignore a door open signal, which prevents an alarm from sounding.

In some embodiments, the access control reader 102 may provide feedback to a user, such as displaying a flashing red light-emitting diode (LED) when access has been denied and a flashing green LED when access has been granted. In some non-limiting examples, an access control reader 102 could be a keypad into which a code is entered a card reader, a keyfob receiver, a radio frequency identifier (RFID) reader, or a biometric reader.

In some embodiments, access control point 104 may be any suitable barrier for which access may be controlled. In some embodiments, an access control point 104 may be a physical facility or a computer-based information system. In some embodiments, an access control point 104 may be a door, turnstile, parking gate, elevator, or other physical barrier, where granting access can be electronically controlled. The access control point 104 may include an electronic lock which is operated by the access control system. In some embodiments, an access control point 104 may also include a sensor to detect when the access control point 104 has been accessed inappropriately and trigger an alarm.

In some examples, the access control point 104 may correspond with an electronic reservation list in a network document that identifies when locations are reserved without providing a confirmation at a user interface at the location. This may correspond with a parking spot or similar location that allows unsecured access to the location but access may still be restricted.

In some embodiments, access credential 106 may be embodied on any suitable physical/tangible object, data, a piece of knowledge, or a facet of a user's physical being that enables an individual access to a given access control point 104. In some embodiments, an access device 106 may be something a person knows (such as a token, digital signature, or PIN), something they have (such as an access badge), something they are (such as a biometric feature), or some combination of these.

In some embodiments, the access control point 104 may correspond with an universal access control device is an electronic device capable of receiving an access request from a user device 112 and causing the access control system to grant access to the access control point 104. In some embodiments, the universal access control device may be installed between the access control reader 102 and an access control board in the access control system. In at least some of these embodiments, the access control device may include a splitter device and a receiver device. In embodiments in which the access control reader 102 includes a wireless communication receiver, the access control device may include at least a receiver device and a transmitter device. In this example, the access control device may receive a signal from a user device 112, determine whether access should be granted to an operator of the user device 112, and transmit a signal to the access control reader 102 to cause it to grant access to the operator of the user device 112. Each of these embodiments will be described in greater detail below.

In some embodiments, network 110 may include any one or a combination of many different types of communication networks, such as cable networks, the Internet, wireless networks, cellular networks, and other private and/or public networks. Additionally, the network 110 may represent communications transmitted over a landline phone, via a kiosk, or in any other suitable manner.

For clarity, a certain number of components are shown in FIG. 1 and throughout the disclosure. It is understood, however, that embodiments of the invention may include more than one of each component. In addition, some embodiments of the invention may include fewer than or greater than all of the components shown in FIG. 1. In addition, the components in FIG. 1 may communicate via any suitable communication medium (including the internet), using any suitable communications protocol.

Figure 2:
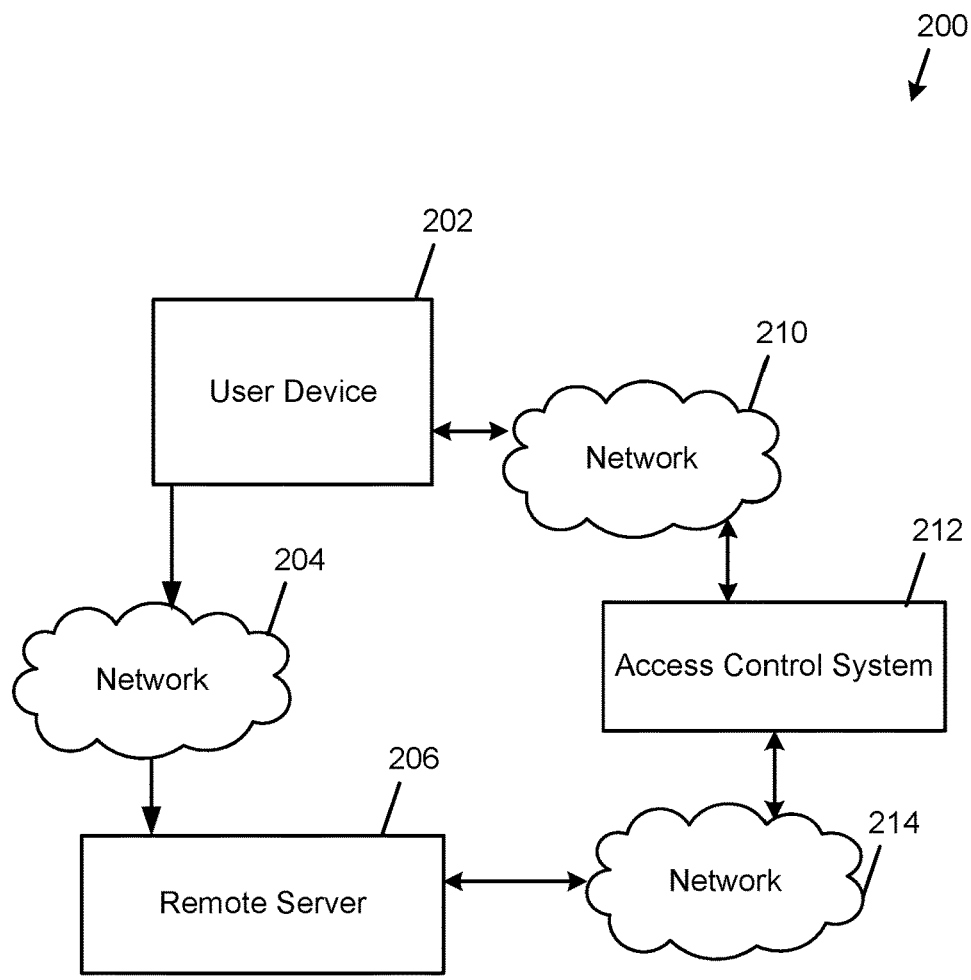
FIG. 2 illustrates example computing devices that may grant access to a location, according to an embodiment of the disclosure.

FIG. 2 illustrates example computing devices that may grant access to a location, according to an embodiment of the disclosure. In illustration 200, one or more users may utilize user devices 202 to communicate with a remote server 206 via a first network 204. The user device 202 may also be in communication with an access control system 212 via a wireless communication protocol 210 or a second network. The access control system 212 may be in communication with a remote server 206 via a third network 214.

The user device 202 may transmit data or other messages via an Internet communication protocol to communicate with the remote server 206 via a first network 204. The communication protocol may correspond with International Organization of Standardization (ISO). In these messages, the user device 202 may request a token prior to requesting access from the access control system 212.

The user device 202 may also correspond with the access control system 212 via a second network 210. The user device 202 may detect an access control unit of the access control system 212 using a wireless receiver that enables communications on the second network 210. The wireless receiver may be manufactured in accordance with a Bluetooth® series of wireless communication standards. The user device 202 may detect the access control unit through a discovery process enabled by the communication protocol. In this example, the access control unit may be located proximate to a wireless receiver.

The access control system 212 may also correspond with the remote server 206 via a third network 214. The third network 214 may correspond with the Internet communication protocol of the first network 204 or other networks known in the art.

Figure 3:
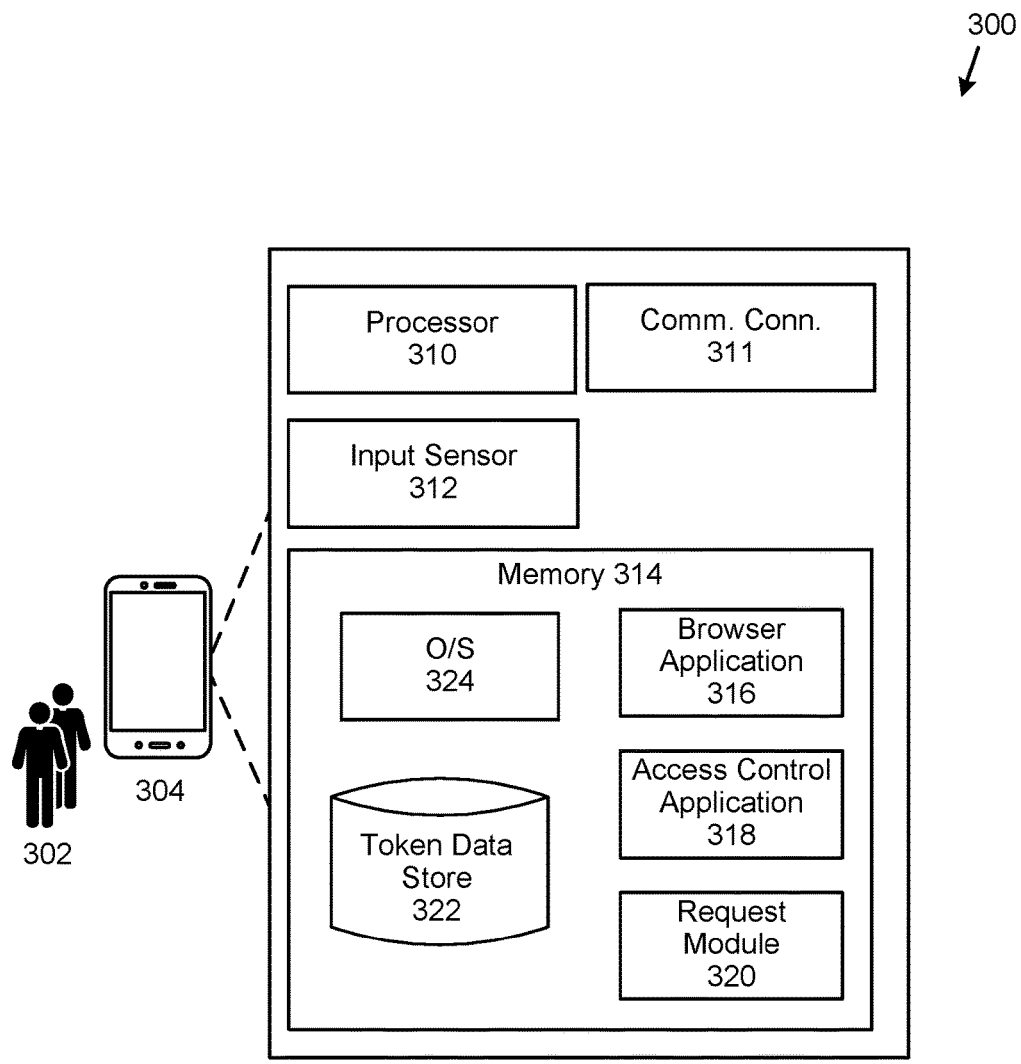
FIG. 3 illustrates example components of a user device, according to an embodiment of the disclosure.

FIG. 3 illustrates example components of a user device, according to an embodiment of the disclosure. In some embodiments, one or more users 302 may operate one or more user devices 304. User device 304 may be any suitable type of computing device such as, but not limited to, a mobile phone, a smart phone, a personal digital assistant (PDA), a laptop computer, a desktop computer, a server computer, a thin-client device, a tablet PC, etc. Additionally, user device 304 may be any type of wearable technology device, such as a watch, earpiece, glasses, etc. The user device 304 may be configured to communicate with via a wireless communication means (e.g., via Bluetooth®) via a communication connection 311 (e.g., antenna, sensor, etc.). In some embodiments, the user device 304 may comprise various mobile applications (i.e., a set of computer-executable instructions) that enables communication via one or more communication protocols, including enabling access to an access control system 212.

The user device 304 may include one or more processors 310 capable of processing user input. The user device 304 may also include one or more input sensors 312 for receiving user input and/or conditions associated with the user device 304. As is known in the art, there are a variety of input sensors 312 capable of detecting user input, such as accelerometers, cameras, microphones, etc. The user input obtained by the input sensors may be from a variety of data input types, including, but not limited to, audio data, visual data, or biometric data. Embodiments of the application on the user device 304 may be stored and executed from its memory 314.

Turning to the contents of the memory 314 in more detail, the memory 314 may include a browser application 316. The browser application 316 may enable access to a network document to request access to a building, a parking spot, or other restricted access area. Examples of the network document and corresponding user interface are provided with at least FIG. 7.

The browser application 316 may allow the users 302 to interact with one or more remote servers, such as to store, access, and/or manage data, develop and/or deploy computer applications, and/or interact with web content. In some embodiments, at least some of the one or more remote servers, perhaps arranged in a cluster of servers or as a server farm, may be configured provide access credentials to user device 304 via the browser application 316 or via the access control application 318. Although depicted in memory of the user device 304 in this example, in some embodiments browser application 316 may be hosted at a server. For example, user device 304 may be a thin client device capable of accessing a browser application 316 remotely. The browser application 316 may be capable of handling requests from many users 302 and serving, in response, various user interfaces that can be rendered at user device 304 such as, but not limited to, a web site. The browser application 316 may be any type of application or interface that supports user interaction with a website, including those with user interaction, such as social networking sites, electronic retailers, informational sites, blog sites, search engine sites, news and entertainment sites, and so forth. As discussed above, the described techniques can similarly be implemented outside of the browser application 316, such as with other applications running on the user device 304.

The memory 314 may also include an access control application 318 that is capable of communicating access credentials to an access control unit of the access control system. The access control application 318 may be configured to cause the user device 304 to provide access credentials to an access control unit. In some embodiments, the access control application 318 may be in communication with one or more remote servers that provide backend support for the access control application. The one or more remote servers may be configured to determine which access control points user device 304 is authorized to gain access to and provide a credential to be used in gaining access. For example, the remote server may determine that the user is to make a delivery to a secure location. Upon making that determination, the remote server may generate a token that may be used to digitally sign a request to gain access to the secure location within a particular time. The remote server may then transmit the token to the access control application 318 on the user device 304.

The memory 314 may also include a request module 320. The request module 320 may be dedicated to requesting access to the remote server rather than requesting access through browser application 316. In some examples, the request module 320 may duplicate the functionality of the browser application 316. Examples of the network document and corresponding user interface are provided below.

The request module 320 may be configured to generate a request comprising a digital signature. For example the request module may generate a one-way hash of electronic data to be signed by the token in order to generate the digital signature associated with the request. The request module 320 may transmit the digital signature electronically to an access control unit via a first communication protocol or may transmit the digital signature electronically to a remote server via a second communication protocol. The transmission of data may be limited by the network accessibility of the access control unit or the user device at the time that the request is transmitted. The request module 320 may be configured to incorporate a current time with the request, so that the current time may be compared with a time range of approved access.

The user device 304 may receive one or more tokens from the remote server in response to request for access via the browser application 316 or at the request module 320. The tokens may be stored in a token data store 322. The tokens may be stored in an encrypted or unencrypted format at the user device 304.

Figure 4:
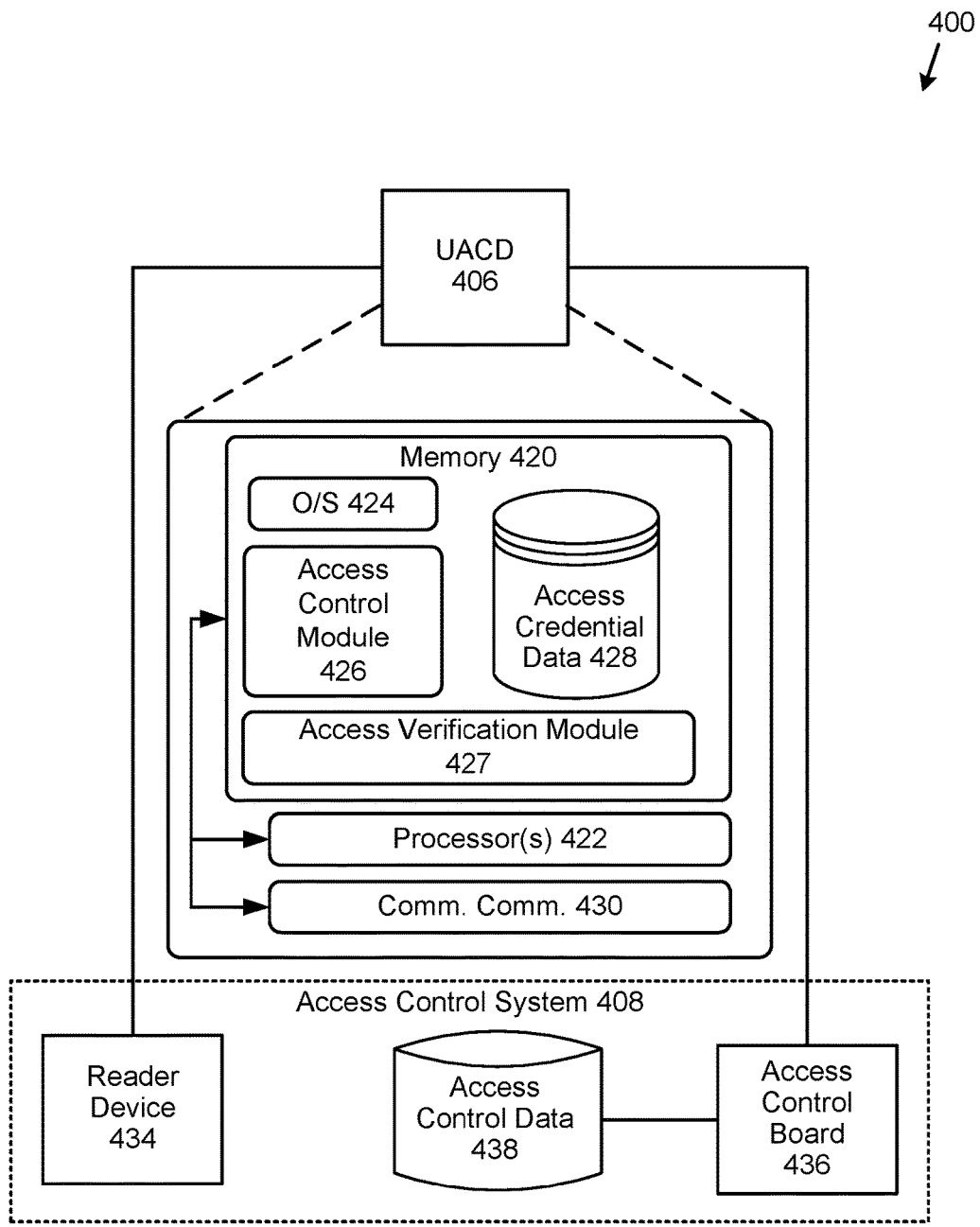
FIG. 4 illustrates example components of an access control system, according to an embodiment of the disclosure.

FIG. 4 illustrates example components of an access control system, according to an embodiment of the disclosure. An illustration 400, an access control system is provided. The access control system may comprise an access control device, an access control reader unit, and one or more components. In some examples, an access control unit may be installed at a building for access to an access point. The access control unit may communicate with the remote server, and the remote server may comprise functionality that duplicates or replaces the universal access control device 406 as illustrated and FIG. 4. Various embodiments of the access control system are also available, including access control systems that are known in the art.

In some embodiments, the universal access control device 406 may be a computing device configured to receive information from a user device, determine whether a user should be granted access to an access control point, and transmit a valid access credential to the access control system upon determining that the user is authorized to access the access control point.

Figure 5:
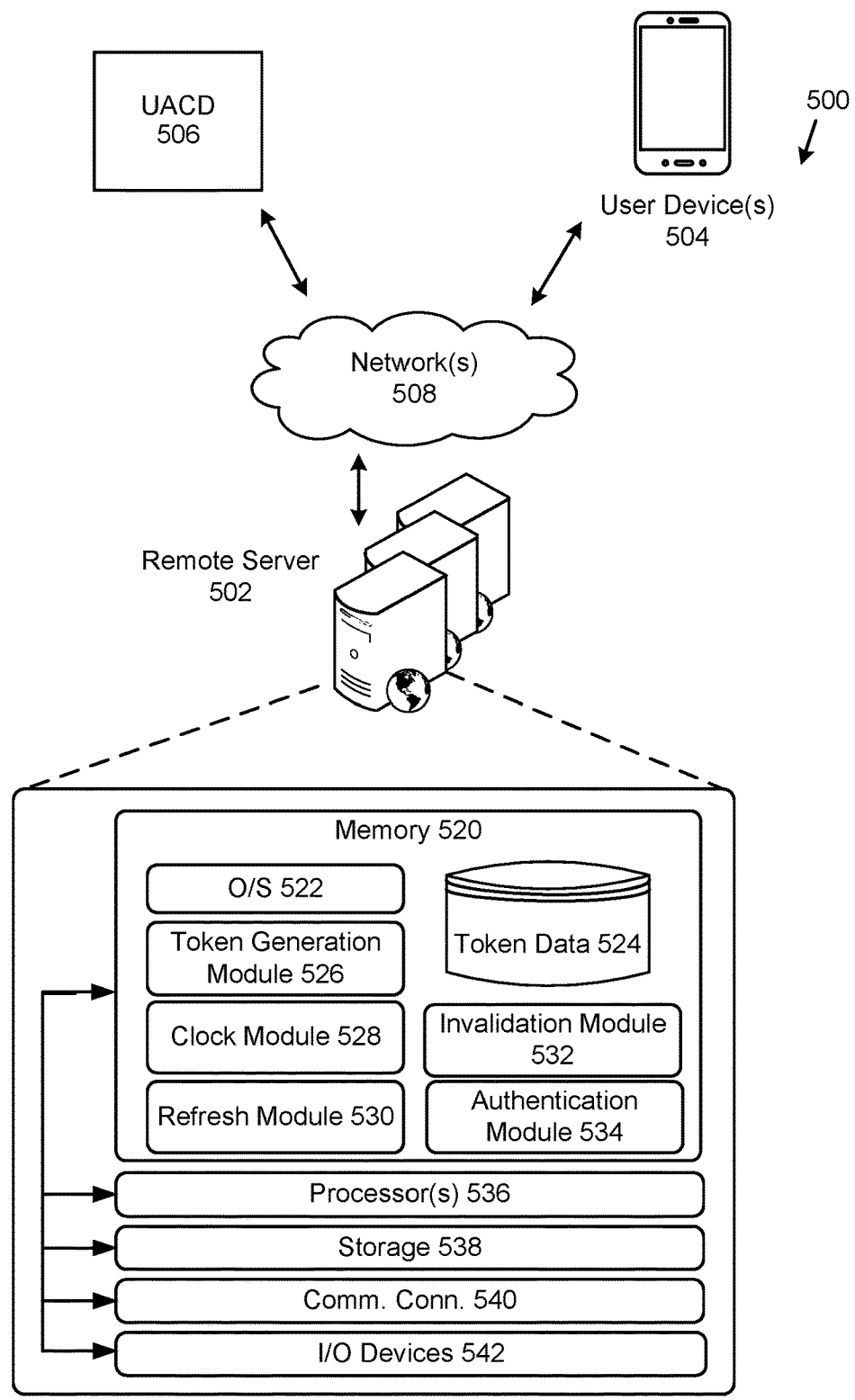
FIG. 5 illustrates example components of a computing device or remote server, according to an embodiment of the disclosure.

In some embodiments, the universal access control device 406 may be a pass through or proxy for the remote computing device illustrated in FIG. 5. For example, a user device may interact with the reader device 434 to provide credentials or a digital signature to the reader device 434. The reader device 434 may transmit (wired or wirelessly) to the universal access control device 406, which in turn transmits the credentials or a digital signature to the remote computing device for authentication. The universal access control device 406 may not alter the data. In some examples, the user device may encrypt the credentials or digital signature using a public key of the remote computing device. The encrypted data may be provided to the reader device 434, which transmits the data to the universal access control device 406, which transmits the data to the remote computing device for authentication.

In some examples, the universal access control device 406 may alter the credentials or a digital signature to correspond with a data format required by the remote computing device. This may include, for example, by adding a header to the credentials or digital signature, by encrypting the credentials or digital signature using a public key of the remote computing device, and the like.

In some embodiments, at least a portion of functionality described in relation to the universal access control device 406 may be executed remotely at the remote computing device illustrated in FIG. 5. For example, some of the functionality described may be executed by one more virtual machines implemented in a hosted computing environment. The hosted computing environment may include one or more rapidly provisioned and released computing resources, which computing resources may include computing, networking, and/or storage devices. A hosted computing environment may also be referred to as a cloud-computing environment.

In one illustrative configuration, the universal access control device 406 may include at least one memory 420 and one or more processing units (or processors) 422. The processors 422 may be implemented as appropriate in hardware, computer-executable instructions, firmware or combinations thereof. Computer-executable instruction or firmware implementations of the processors 422 may include computer-executable or machine executable instructions written in any suitable programming language to perform the various functions described.

The memory 420 may store program instructions that are loadable and executable on the processors 422, as well as data generated during the execution of these programs. Depending on the configuration and type of universal access control device 406, the memory 420 may be volatile (such as random access memory (RAM)) and/or non-volatile (such as read-only memory (ROM), flash memory, etc.). The universal access control device 406 may also include additional storage, such as either removable storage or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 420 may include multiple different types of memory, such as static random access memory (SRAM), dynamic random access memory (DRAM) or ROM. Turning to the contents of the memory 420 in more detail, the memory 420 may include an operating system 424 and one or more application programs or services for implementing the features disclosed herein including at least a module for causing an access control system to unlock an access control point (access control module 426). The memory 420 may also include access credential data 428, which contains an access credential that can be used to gain access to an access control point. In some embodiments, the access credential data 428 may be stored in a database.

The memory 420 may be either removable and non-removable memory and may include non-transitory, computer-readable storage media. For example, computer-readable storage media may include volatile or non-volatile, removable or non-removable media implemented in any method or technology for storage of information such as computer-readable instructions, data structures, program modules or other data. As used herein, modules may refer to programming modules executed by computing systems (e.g., processors) that are part of the user device or the universal access control device 406. The universal access control device 406 may also contain communications connection(s) 430 that allow the universal access control device 406 to communicate with a stored database, another computing device or server, user terminals, and/or other devices (e.g., the user device and/or the access control system). For example, the communication connections 430 may include a wireless receiver (e.g., a Bluetooth® receiver).

Turning to the contents of the memory 420 in more detail, the memory 420 may include an operating system 424, a database containing access credential data 428, and one or more application programs or services for implementing the features disclosed herein, including an access control module 426 and access verification module 427.

In some embodiments, the access control module 426 may be configured to record an access credential into the access credential data 428. For example, the universal access control device 406 may be installed between a reader device 434 and an access control board 436 within an access control system. When the reader device 434 receives an access credential, it may relay the access credential to the access control board 436 via the universal access control device 406. In addition, the universal access control device 406 may record the access credential by overriding an access credential stored in access credential data 428. In some embodiments, the access credential data 428 may be overwritten with the newly-received access credential only if the access control board 436 sends a signal to the reader device 434 to indicate that access has been granted. The access control module 426 may also be configured to receive an access token from the user device and determine whether an operator of the user device should be granted access to an access control point. To do this, the access control module 426 may transmit the access token to a remote server to be validated. Upon receiving a response that indicates that the user is authorized to access the access control point, the access control module 426 may be configured to retrieve an access credential stored in access credential data 428 and relay it to the access control board 436.

In some embodiments, the access verification module 427 may be configured to confirm a digital signature from the remote computing device. In some examples, the universal access control device 406 may receive a second digital signature from the remote computing device and authenticate the digital signature prior to allowing access to the secure location for the user device. In some examples, access credential data may be stored in the access credential data store 428, the access credential data store 428 may be stored with the remote computing device, or may be received from a secondary memory in a network location.

Access credential data 428 may be overwritten with a most-recently-used valid access credential. Each time that a new access credential is presented to the reader device 434 of the access control system 408, an access credential currently stored in the access credential data 428 may be overwritten with the new access credential.

In some embodiments, the access control system may include a reader device 434 and an access control board 436. The reader device 434 may be an example of the access control reader 102 depicted in FIG. 1. Upon receiving an access credential from an access control mechanism, the reader device 434 may relay the access credential to the universal access control device 406 and subsequently to the access control board 436. The access control board 436 may compare the access credential to entries on a control list stored within access control data 438. In some embodiments, the access control data 438 may be stored locally in the access control system. In some embodiments, the access control data 438 may be stored on a remote server in communication with the access control board 436. Upon determining that the access credential is valid (e.g., matches an entry in the access control data 438), the access control board 436 may grant access to an access control point (e.g., cause an electronic lock to open).

The universal access control device can be used with access control systems already on the market, regardless of the type of access device used by that access control system. Additionally, access tokens used by the universal access control device may be managed by a remote server (e.g., using a cloud computing environment).

In some embodiments, the universal access control device may be installed within a proximate distance to a reader device of the access control system. In these embodiments, the reader device may be configured to receive wireless transmission of credentials from an access device. The universal access control device may be programmed with credential information appropriate for the access control system. For example, the universal access control device may contain a pre-authorized credential which will be activated when a valid access request is received. When a user needs to gain access to the access control point managed by the access control system, that user might submit a request for an access token to a remote server. The remote server may provide the requested access token to a user device associated with the user. The user is then able to use his or her user device to communicate the access token to the universal access control device. The universal access control device validates the provided access token. Once validated, the universal access control device retrieves the credential stored in memory and transmits it to the reader device in order to enable the user to gain entry.

In some embodiments, the universal access control device may be installed between a reader device of the access control system and an access control board of the access control system. In some case, the universal access control device may comprise multiple devices. For example, the universal access control device may include a splitter device in communication with a remote server via a network connection.

This example universal access control device may also include a receiver device located remote from the splitter device which is also able to communicate with the remote server via a network connection. The universal access control device may receive a credential from a reader device when a user presents his or her access device to gain entry (e.g., via the splitter device). The universal access control device may include in its memory computer-executable instructions that may cause the universal access control device to relay the received credential to an access control board. Upon the access control board determining that the credential is valid (by referencing a control list maintained either locally or remotely), the access control board may provide an indication to the universal access control device that the credential is valid (e.g., the access control board may send a signal to light up an indicator or a signal to a relay switch to open a door).

Upon receiving that indication, the universal access control device may store the received credential in memory to be used later. The universal access control device may store a number of credentials in this manner. For example, the universal access control device may store the last X credentials presented by users having a valid access device, where X is some predetermined number. In some embodiments, the universal access control device may be configured to cycle through the X credentials that it provides to an access control system. When a user needs to gain access to the access control point managed by the access control system, that user might submit a request for an access token to a remote server. The remote server may provide the requested access token to a user device associated with the user. The user is then able to use his or her user device to communicate the access token to the universal access control device (e.g., via a Bluetooth® receiver). The universal access control device validates the provided access token (e.g., by sending it to the remote server for validation).

Once validated, the universal access control device retrieves the credential stored in memory and provides it to the access control board in order to enable the user to gain entry. It should be noted that some embodiments of the universal access control device may not include a receiver device. For example, the system may use geo-fencing to detect when the user enters a proximity of an access control reader. In this example, an access request may be submitted automatically upon detecting that the user is approaching the access control point.

FIG. 5 illustrates example components of a computing device or remote server, according to an embodiment of the disclosure. In illustration 500, a remote server 502 may be in communication with an access control system 506 and one or more user devices 504 via a network 508. The network 508 may include any one or a combination of many different types of networks, such as cable networks, the Internet, wireless networks, cellular networks, and other private and/or public networks.

The remote server 502 may be any type of computing device such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the remote server 502 may be executed by one more virtual machines implemented in a hosted computing environment. The hosted computing environment (e.g., a cloud computing environment) may include one or more rapidly provisioned and released computing resources, which computing resources may include computing, networking, and/or storage devices.

In one illustrative configuration, the remote server 502 may include at least one memory 520 and one or more processing units (or processors) 536. The processors 536 may be implemented as appropriate in hardware, computer-executable instructions, firmware or combinations thereof. Computer-executable instruction or firmware implementations of the processors 536 may include computer-executable or machine executable instructions written in any suitable programming language to perform the various functions described.

The memory 520 may store program instructions that are loadable and executable on the processors 536, as well as data generated during the execution of these programs. Depending on the configuration and type of remote server 502, the memory 520 may be volatile (such as random access memory (RAM)) and/or non-volatile (such as read-only memory (ROM), flash memory, etc.). The remote server 502 may also include additional storage 538, such as either removable storage or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 520 may include multiple different types of memory, such as static random access memory (SRAM), dynamic random access memory (DRAM) or ROM.

The remote server 502 may also contain communications connection(s) 540 that allow the remote server 502 to communicate with a stored database, another computing device or server, user terminals, and/or other devices on the network(s) 508. The remote server 502 may also include input/output (I/O) device(s) and/or ports 542, such as for enabling connection with a keyboard, a mouse, a pen, a voice input device, a touch input device, a display, speakers, a printer, etc.

Turning to the contents of the memory 520 in more detail, the memory 520 may include an operating system 522 and one or more application programs or services for implementing the features disclosed herein including at least a token generation module 526, a clock module 528, a refresh module 530, an invalidation module 532, and an authentication module 534.

The memory 520 may comprise a token generation module 526. The token generation module 526 may determine a level of access to be granted to a user and generate a token to be used to obtain access to an access control point. The token may comprise text that may be sent in the clear or encrypted. In some examples, the generated token may correspond with a single user device, time, and location.

An access token may be any suitable string of characters used to map a request to permissions associated with the request. A token may be a string of numbers, letters, or any other suitable characters. The access token can be a large random number so that the odds of a speculative guess of the token are effectively zero. The access token may be associated with an expiration date that may be a numeric value (e.g. a 4-digit numeric value). In some embodiments, the token expiry date can be expressed as a time duration as measured from the time of issuance. A token service system used to generate the access token may include or be in communication with a token vault where the generated tokens are stored. Access tokens may be generated in a number of ways. In some embodiments, access tokens may be randomly generated and assigned to each request received by a remote server.

The access token may be time-bound so that access can be allowed to the corresponding location starting at one timestamp and ending at another. If desired, the access can begin at a current time corresponding with when the access is requested by the user device. The access token may be kept secret from third parties.

In some embodiments, the token generation module 526 may be configured to receive requests related to accessing a secure area. For example, a user may submit a request to access a secure area during a particular period of time. The remote server, upon determining that the user should be granted access, may generate or assign a token using the token generation module 526 to be used in granting that access. The token may be stored in token data store 524 in relation to one or more use conditions (e.g., a period of time during which the token is valid or a number of uses). The token may then be transmitted to the user device 504 (e.g., using the communications connection(s) 540) prior to the user device 504 using the token to generate a digital signature for authentication and access.

In some embodiments, the remote server 502 may, upon receiving a request, identify an access token which is not currently mapped to a request and may map that access token to the request. Upon receiving an access token, the remote server 502 may determine that the access token is valid by querying token data store 524 in order to determine whether the token is associated with permissions that match conditions of the universal access control device from which the electronic requests with a digital signature has been received. For example, the remote server 502 may determine if the digital signature is mapped to a locally-stored token associated with the access control system.

The memory 520 may comprise a clock module 528. For example, the remote server may receive the credential or digital signature from the access control system. The remote server may generate another credential using a stored token associated with the user and location. The particular token may correspond with a time determined by the clock module 528. For example, the token may be valid after a start time and before an end time, or within a time range and associated with a particular time zone of the location. The clock module 528 may determine whether the time corresponding with receiving the credential from the user device is within the start time and the end time, by determining a current time and comparing the current time with the time corresponding with receiving the credential. When the time that the credential is received is within the time range of permissible access, then the clock module 528 may determine that the credential is valid in at least one aspect.

The memory 520 may comprise a refresh module 530. For example, the user device may enroll with a mobile device management application that detects the presence of a compromised device (e.g., "jailbroken" or "rooted" operating systems on devices, etc.). In some examples, the user device may initiate a scan of the user device and transmit a message to a remote server identifying the presence of malware based at least in part on the scan. In some examples, the remote server may also detect the presence of malware remotely from the user device when the remote server is enabled to scan the device to detect the malware. In some examples, a user may report the user device as lost or stolen to a remote server or third-party entity and the identification of the compromised device may be recorded in a data store. In some examples, the compromised user device may be tagged in the data store.

In some examples, the refresh module 530 may be configured to refresh tokens after a determination that the user device has been compromised. For example, the tokens corresponding with the compromised user device may be invalidated using the invalidation module 532. The refresh module 530 may determine a plurality of tokens that are stored in the token data store 524 for the user device and generate a new token for each of the plurality of tokens using the token generation module 526. The new token(s) may be transmitted to the user device to overwrite the previously transmitted (and potentially compromised) tokens at the user device. The new token(s) may also be stored at the token data store 524. For tokens that expired and/or were compromised, the token generation module 526 may not generate new tokens.

The memory 520 may comprise an invalidation module 532. For example, the invalidation module 532 may determine that a user device and/or token has been compromised. The invalidation module 532 may delete the stored token from the token data store 524 or tag the stored token at the token data store 524 without deleting the stored token. Tagging the stored token may render the token unusable. In some examples, the invalidation module 532 may not authenticate the user device when the user device transmits the credential or digital signature of a request to access a secure location that has been generated by the invalid token.

The memory 520 may comprise an authentication module 534. The authentication module 534 may be configured to receive a token from the universal access control device 506 and determine whether access should be granted. Upon receiving the digital signature from the universal access control device 506, the authentication module 534 may compare the corresponding access token used to generate the digital signature to the access tokens stored in the token data store 524 to determine the authentication of the user device. Upon determining that the token used to generate the digital signature is valid, the authentication module 534 may be configured to provide instructions to the universal access control device 506 to grant access to an operator of the user device 504.

In some examples, the authentication module 534 may generate a credential using a stored token and compare the generated credential with a received credential from the user device 504. Both devices may use a hash function that is stored remotely with the user device 504 and the authentication module 534.

The memory 306 may also include token data store 524. The token data store 524 may comprise one or more tokens used in access control. For example, the token may be input for a hash function and the output may be the credential or a digital signature that corresponds with the token.

In some examples, the modules and functionality of the remote server 502 may be stored with the memory of the universal access control device 506. For example, the universal access control device 406 may comprise an authentication module 534 to compare the generated credential with a received credential from the user device 504. Both devices may use a hash function that is stored remotely with the user device 504 and the universal access control device 506. This may enable access to the secure location when network connectivity between the universal access control device 506 and the remote server 502 is inconsistent or lost.

Figure 6:
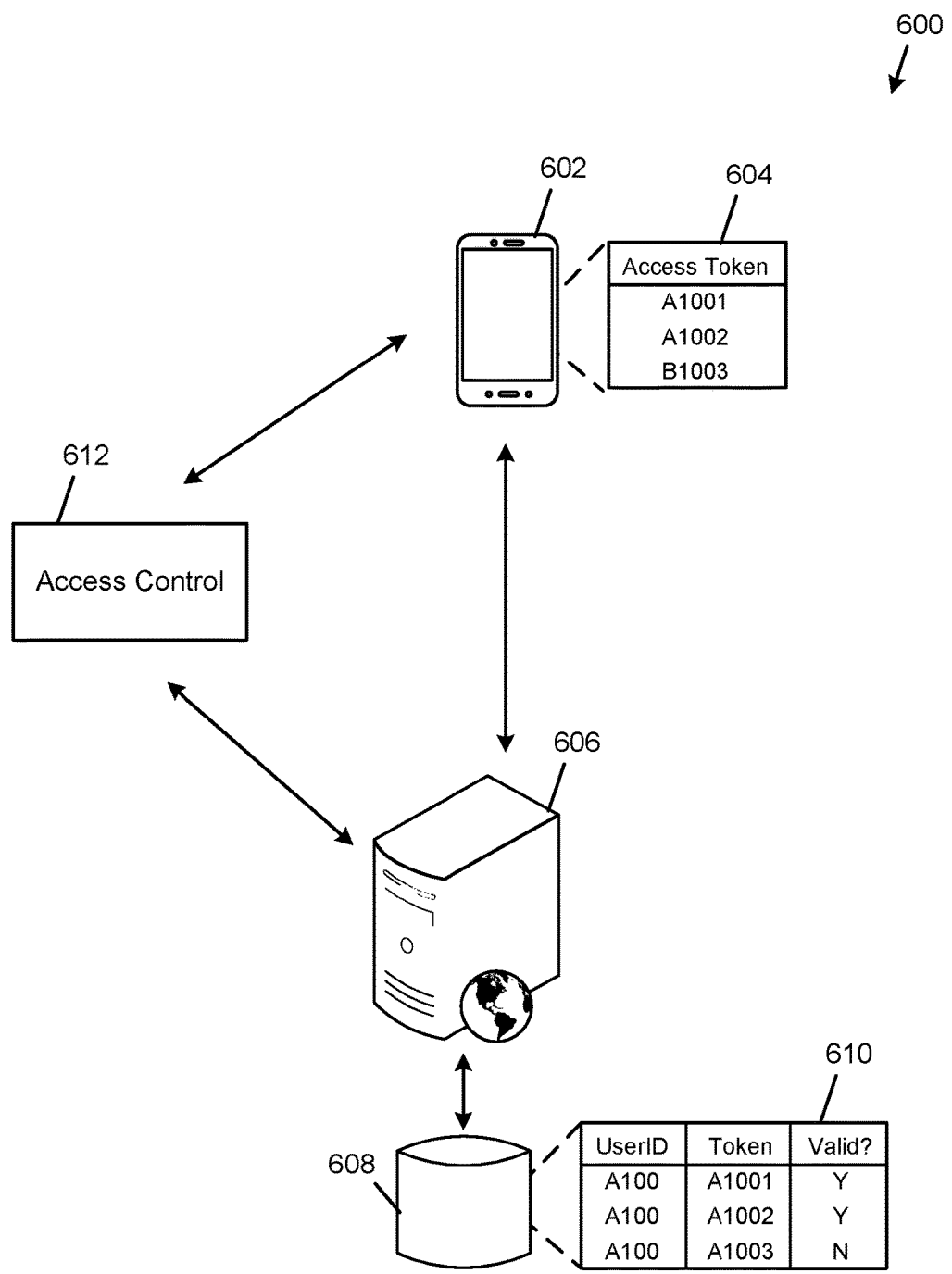
FIG. 6 shows a sample illustration of tokens that are stored at a user device and/or computing device, according to an embodiment of the disclosure.

FIG. 6 shows a sample illustration of tokens that are stored at a user device and/or computing device, according to an embodiment of the disclosure. In illustration 600, the user device 602 may store one or more tokens 604 and the remote server 606 (e.g., computing device) may also store one or more tokens 610 in a data store 608. The one or more tokens 604 may be stored in a secure element of the user device 602 and/or an encrypted file format at user device 602. The one or more tokens 604 of the user device 602 and the one or more tokens 610 of the remote server 606 may not be transmitted to access control system 612 in order to gain access to an access point by the user device 602.

In some examples, the one or more tokens 604 of the user device 602 may not be transmitted to the remote server 608. Instead, the user device 602 may transmit the digital signature or other credential to the access control system 612 which transmits it to the remote server 606 for authentication.

When the one or more tokens 604 are transmitted to access control system 612, the access control system 612 may be enabled to authenticate the user device 602 using the cached or locally stored credentials at the time when the user device requests access to the secure location, rather than the remote server 606. For example, at a first time, the one or more tokens 604 are transmitted to access control system 612 in response to a first request to access a secure location. At a second time, using the one or more tokens 604, the access control system 612 may generate a one-way hash of electronic data to be signed by the token in order to generate the digital signature. The access control system 612 can receive a second request to obtain access to the location. The second request may be initiated via a communication protocol (e.g., Bluetooth, etc.) between the access control unit 612 and the user device.

The access control system 612 and the remote server may communicate via a communication channel provided through the user device. For example, the access control system 612 may not communicate with the remote server when the communication protocol between these devices is inoperable (e.g., poor reception area, lost service, etc.). Instead, the access control system 612 may generate the digital signature for authentication and transmit this second digital signature to the remote server using the user device's communication functionality (e.g., via Wi-Fi, etc.). The user device may then transmit both digital signatures, one of which is generated by the user device and one of which is generated by the access control system 612 to the remote server via the communication protocol on behalf of the access control system 612.

In some examples, the access control system 612 may generate the digital signature using the one or more tokens 604 using a similar signing process at the access control system 612 using the locally stored token and public-key or asymmetric cryptography. The access control system 612 may then permit access to the location for the user device 602 corresponding with the approved time range requested by, for example, transmitting an instruction to unlock a door to the secure location.

In some examples, the remote server 606 may track the validity of the tokens. For example, when a token has expired, the remote server 606 may identify the token as invalid at the data store 608 or delete token from the data store 608. In some examples, the remote server 606 may identify that the user device 602 has been compromised. The remote server 606 may delete the stored token from the data store 608 or tag the stored token at the data store without deleting the stored token. Tagging the stored token may render the token unusable and the remote server 606 may not authenticate the user device 602 when the user device transmits the credential or digital signature generated by the invalid token.

Figure 7:
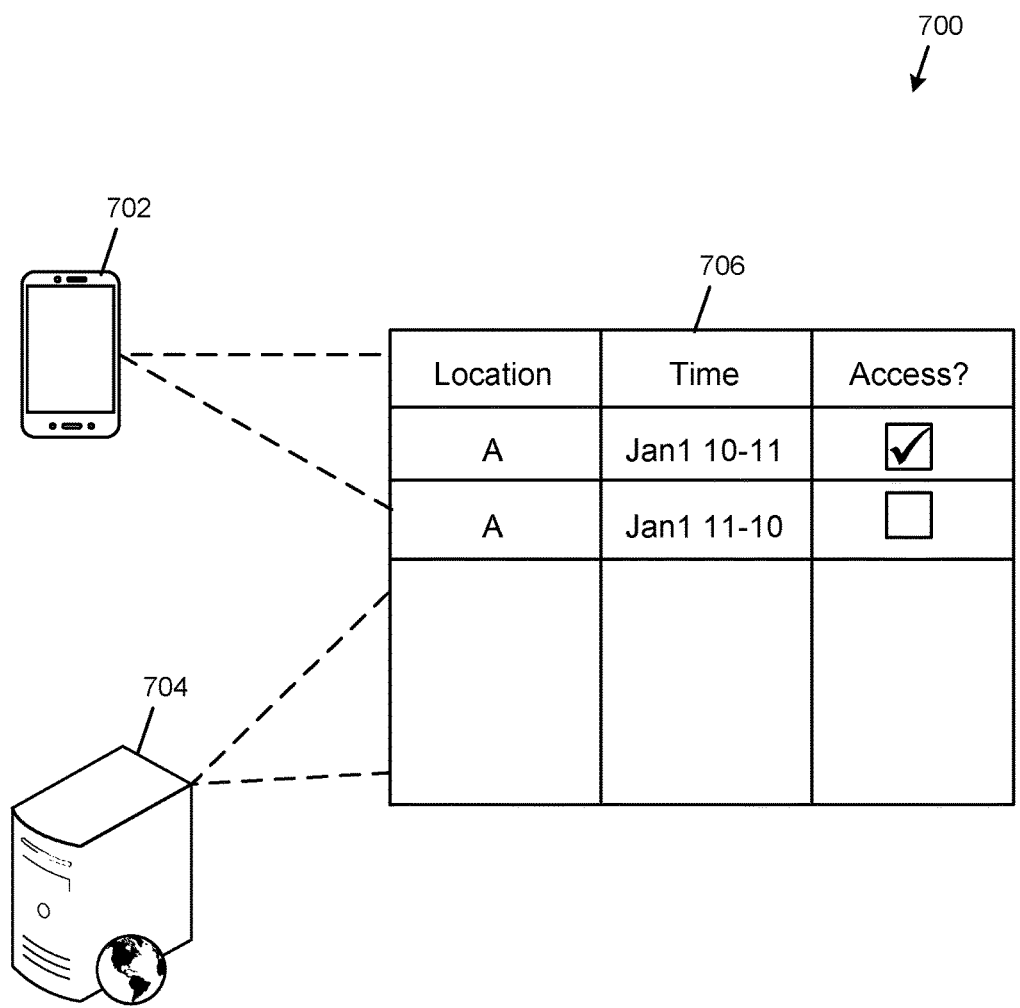
FIG. 7 illustrates an example of the user interface for transmitting a request for access to location, according to an embodiment of the disclosure.

FIG. 7 illustrates an example of the user interface for transmitting a request for access to location, according to an embodiment of the disclosure. In illustration 700, the computing device 704 (e.g., remote server, third party entity, etc.) may provide a user interface 706 that is accessed by a user device 702 to request to obtain access to the secure location. For example, a user device 702 can interact with a network page 706 that identifies a plurality of locations, time options, time ranges (e.g., start time, end time, etc.), and tools to request access to the corresponding locations. In some examples, the user device 702 may interact with the user interface 706 to select a start time and an end time that the user device 702 plans to access the location. The user interface 706 may display the location and time range that the user device 702 is permitted to access at the user interface. Other types of information may be presented at the network page 706 without diverting from the scope of the disclosure.

In some examples, user interface 706 may be configured to initiate a transaction associated with permitting access to the location. For example, the user interface 706 may receive a user identifier and/or payment option to permit access to the location during the time range. The details of the transaction may vary based at least in part on the location and the duration of time range. In some examples, the details of the transaction may vary based at least in part on the user identifier as well.

In some examples, user interface 706 may be configured to receive multiple requests to access locations at one time. For example, the user may identify a plurality of locations and a plurality of time ranges at the user interface 706 and initiate a single transaction. In some examples, the remote server may transmit a plurality of tokens associated with the single transaction. Each of the plurality of tokens may correspond with the user device that initiated the request in the single transaction, and each individual token may correspond with each individual location and time range. Multiple tokens may correspond with a single location for access within different time ranges.

Figure 8:
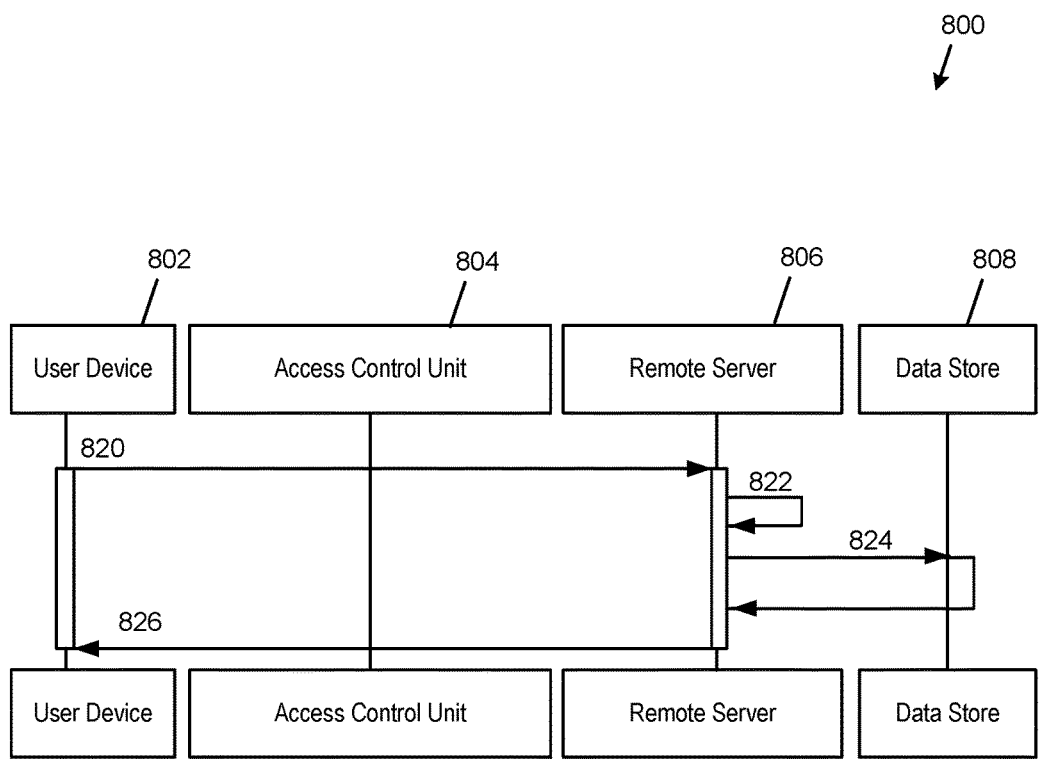
FIG. 8 illustrates an example method of generating and transmitting a request, according to an embodiment of the disclosure.

FIG. 8 illustrates an example method of generating and transmitting a request, according to an embodiment of the disclosure. In illustration 800, a user device 802 (which may be an example of user device 304 depicted in FIG. 3) may access a network page as illustrated in FIG. 7 to select one or more locations, time options, and tools to request access to the corresponding locations. One or more computing devices described throughout the application, including the remote server 806, may correspond with the user device 802 to generate and provide a token to permit access to the requested location(s).

At step 820, the user device 802 may request an access token via the network page that is provided by the remote server 806. The network page may receive the information from the user device 802 and transmit the information to the remote server 806. In some examples, the information may comprise a user identifier, a desired location, a confirmation of payment or initiation of a transaction, and a time. The information may identify the desired time to access the location presented in the network page. The remote server 806 may store the information in a data store 808 associated with the remote server 806.

At step 822, the remote server 806 may generate a token for the user device 802. The token may comprise any suitable string of characters used to map a request to permissions associated with the request. At step 824, the remote server 806 may store the token in a data store 808 associated with the remote server 806.

At step 826, the remote server 806 may transmit the token to user device 802. The remote server 806 may transmit the token to the user device 802 via a first communication protocol. The first communication protocol may include an internet protocol, Hypertext Transfer Protocol (HTTP), HTTP within a connection encrypted by Transport Layer Security or Secure Sockets Layer (HTTPS), and the like. When transmitting the token, the user device 802 may readily have access to the first communication protocol since the user device 802 may not be located at the location with access control unit 804, but may be reserving access to the location for a later time. In some examples, the transmission via the first communication protocol may be initiated when the user device 802 has access to the communication network associated with the first communication protocol. User device 802 may store the token locally at a memory of the user device 802.

Figure 9:
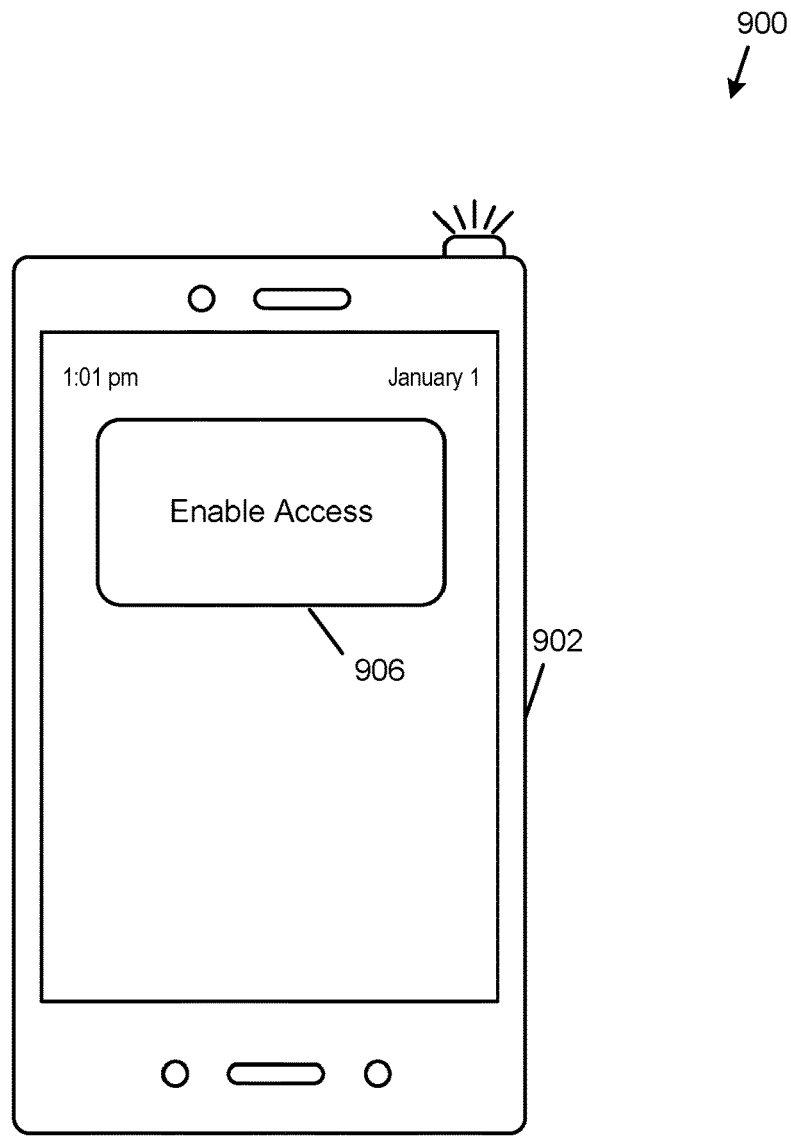
FIG. 9 illustrates an example of the user interface for transmitting a request for access to location, according to an embodiment of the disclosure.

FIG. 9 illustrates an example of the user interface for transmitting a request for access to location, according to an embodiment of the disclosure. As shown in 900, the user device 902 may comprise a module or software application for enabling access to the location. The user device 902 may access the module when the user device is within a proximate distance of an access control unit at a secure location.

At the secure location, the user may activate a tool 906 via user interface of the user device 902 to initiate an authentication process and gain access to the location. Upon activation of the tool 906, the user device 902 may access the token that was previously provided by the remote server. The user device 902 may use the token as input to a hash function to generate a digital signature or credential to provide to the access control unit. The digital signature may identify the user device 902 that previously requested access to the secure location, identify a time that the user device 902 is attempting to access the secure location, and may also confirm that the user device 902 has access to the token without transmitting the token to the access control unit.

The user device 902 may store the digital signature or credential in a temporary or permanent storage of the user device 902. In some examples, the digital signature or credential may be transmitted to the access control unit without storing the digital signature or credential, so that the digital signature or credential is generated and transmitted in near real time. The digital signature or credential may be transmitted to the access control unit during the authentication process.

In some examples, user device 902 may transmit a location of user device 902 with the digital signature or credential. When the location of user device 902 is received by the remote computing device for authentication, the location of user device 902 may be compared with a stored location of the access control unit to confirm that the locations are within a threshold distance of each other. The stored location of the access control unit may be determined by the remote computing device prior to the interaction between user device 902 and the access control unit.

Figure 10:
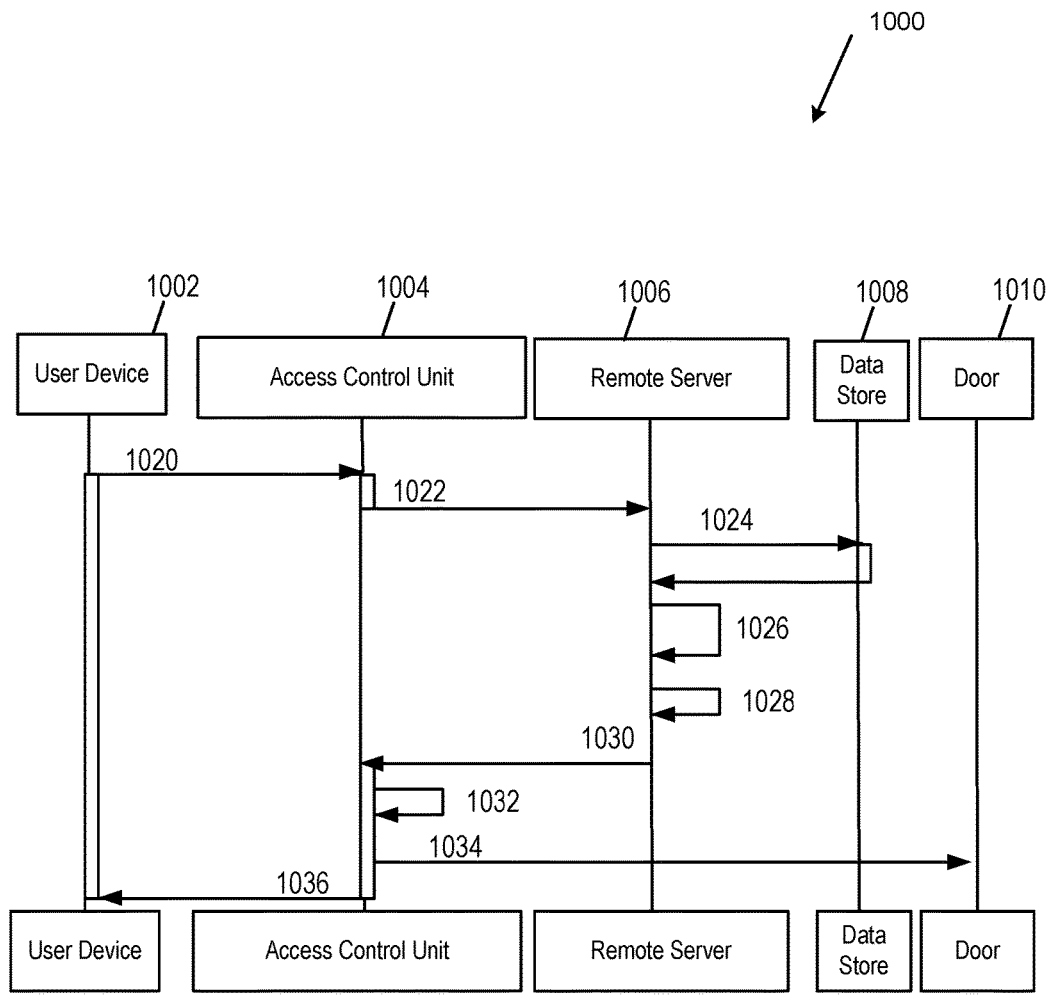
FIG. 10 illustrates an example method of generating and transmitting a request, according to an embodiment of the disclosure.

FIG. 10 illustrates an example method of generating and transmitting a request, according to an embodiment of the disclosure. In illustration 1000, a first illustrative example is provided, where a user operating a user device 1002 wishes to gain entry to a door 1010 or parking garage secured using an access control device 1004 and remote server 1006 described herein. For the purposes of this illustrative example, assume that the user is making a delivery to the building in which the garage is located. In this example, the user may use her user device 1002 to communicate with a remote server 1006 that provides backend support for the access control unit 1004 to request an access token. In this example, the remote server 1006 may have access to the user's delivery schedule and may determine that the user does have a delivery that requires access to the door 1010. The remote server 1006 may then send an access token to the user's user device 1002. Upon arriving at the garage, the user's mobile device may detect the access control unit 1004 using a wireless receiver (e.g., a wireless receiver in accordance with the Bluetooth® series of wireless communication standards) through a discovery process. In this scenario, the access control unit 1004 may be located proximate to a wireless receiver of a door 1010 used in an automated garage-door opening system.

At step 1020, the user device 1002 may transmit the digital signature or credential to the access control device 1004 via a wireless signal. For example, the user device 902 may interact with and access control unit 1004 at an access point of location via a first communication protocol and transmit the digital signature or credential via the first communication protocol.

The token may be used by the user device 1002 to generate a digital signature. For example, the user device 1002 may store a hash function to correlate the characters of the token into a data map of the digital signature. In this example, any other device that uses the same hash function may be able to generate a same digital signature when the hash function uses the same token. In this example, two digital signatures may be generated by different devices, but may generate the same digital signatures when the devices use the same hash function and copies of the same token. The first token that generated the digital signature may be compared with the second token, and when they match, the device that generated the digital signature may be authenticated as having received the correct token to generate the digital signature.

At step 1022, the access control device 1004 may communicate with the remote server 1006 to transmit a request comprising the digital signature to the remote server 1006 via a second communication protocol. The request may comprise the digital signature of the user device 1002 and an identification of the access control unit 1004 that receives the interaction from the user device 1002. The identification of the access control unit 1004 may be used to identify the location that the user device 1002 is attempting to access.

At step 1024, the remote server 1006 may fetch a stored access token that corresponds with the access control unit 1004 and/or user device 1002.

At step 1026, using the stored token, the remote server 1006 may compute a second digital signature using a stored token and compare the second digital signature using the stored token with the received digital signature using the token stored at the user device 1002. The remote server 1006 may determine a match. The permitted location and time may also be identified in the data store 126.

At step 1028, the remote server 1006 may perform other control logic. For example, the remote server 1006 may determine whether the digital signature, token, or time that the access is requested are permitted, based at least in part on the received data.

In a sample illustration, the remote server 1006 may identify token A that corresponds with building A on Main Street in the data store 1008. The request from the access control unit 1004 may be received at 1 PM. The remote server 1006 may identify token A in the data store 1008 and determine that the permitted time to access the secure location is between 2 PM and 4 PM. In this instance, access to location may be denied because the requested time of access is not within the requested time range. When the requested time to access location is within the time range identified in the data store 1008, access to location may be granted.

At step 1030, the remote server 1006 may transmit an authorization message (e.g., stating an approval or denial of access for the user device 1002). The authorization message may be based at least in part on whether the computed digital signature and the received digital signature match.

At step 1032, the access control unit 1004 may validate the response from the remote server 1006. For example, the access control unit 1004 may correspond with an access control system that confirms the sender or contents of the authorization message with authorized data.

At step 1034, the access control unit 1004 transmit an instruction to open the door and/or allow access to the secure area. For example, upon determining that the access token is valid, the access control unit 1004 may be configured to transmit an authorization code to the wireless receiver used in the door 1010 of the automated garage-door opening system to cause it to open the garage door. The user is then able to enter the garage and make her delivery.

In another example, access to the location may be granted. For example, the remote server 1006 may transmit a confirmation message to the access control unit 1004 via a communication protocol. In another example, the door may be unlocked and the user device may be permitted to enter through the unlocked door.

At step 1036, the access control unit 1004 transmit a second authorization message to the user device 1002. For example, the permission of access may be displayed on a user interface provided to the user.

Figure 11:
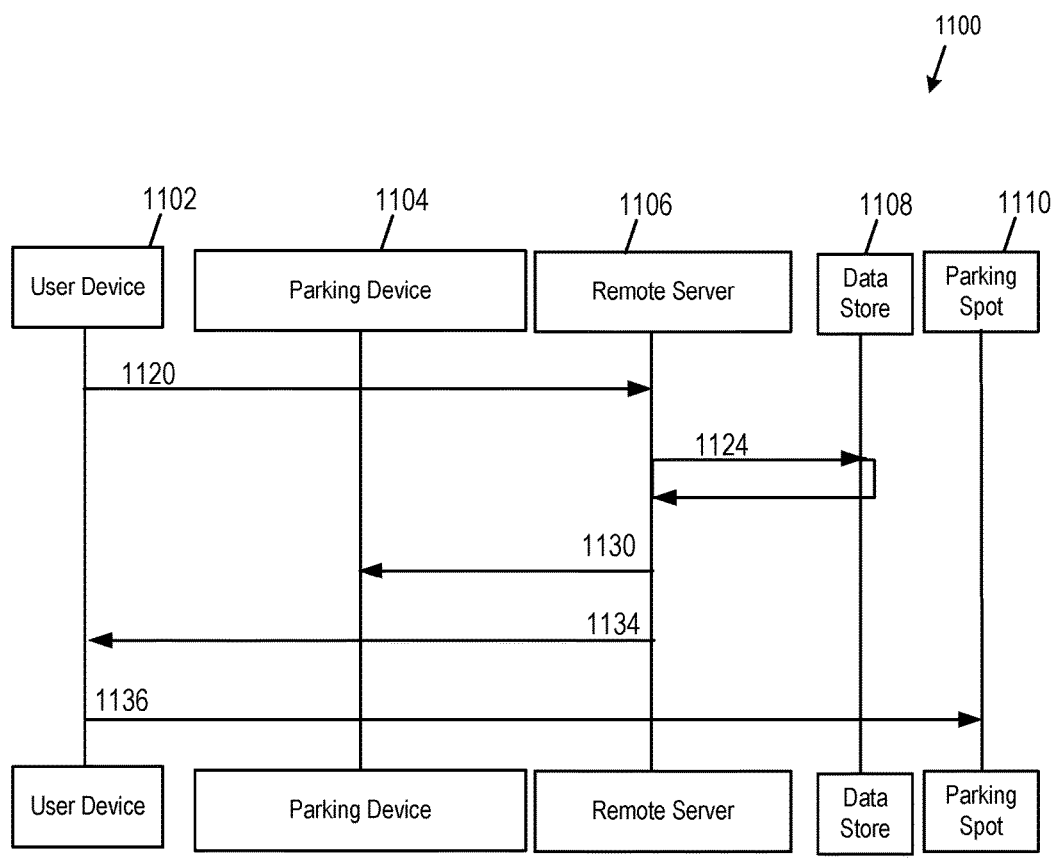
FIG. 11 illustrates an alternative example method of generating and transmitting a request, according to an embodiment of the disclosure.

FIG. 11 illustrates an alternative example method of generating and transmitting a request, according to an embodiment of the disclosure. In illustration 1100, a second illustrative example is provided, where a user operating a user device 1002 wishes to gain access to a parking spot. The parking spot may be in an unsecured location, but monitored. For example, a user device may reserve a parking spot at a network document during a time range and a parking enforcement officer may access the network document to determine which parking spots have been reserved. When a vehicle is located in a parking spot that has not been reserved, the parking enforcement officer may issue a violation for the vehicle. In another example, the parking enforcement officer may confirm that the vehicle located in the parking spot at a particular time is identified in the network document and no violation may be issued.

In another illustrative embodiment, the parking spot 1110 may correspond with a parking device 1104 (e.g., a meter device, etc.) located at the parking spot location. The parking device 1104 may receive an indication that the vehicle is permitted to access the parking spot and display on a user interface that access to the parking spot is permitted (e.g., green light to show that access is permitted, red light to show that access is denied, etc.). In some examples, the indication that the vehicle is permitted may correspond with the license plate, parking spot number, or other identification of the vehicle that is provided with the request for access, as illustrated with FIG. 7. The indication in some examples may correspond with a digital signature, credential, or token discussed throughout the disclosure. In some examples, the confirmation of access to the parking spot may also be transmitted to a user device 1102 prior to the user device 1102 arriving at the parking spot 1110. This may confirm that access is permitted without a requirement for the user device 1102 to have access to a communication network at the same time as the user attempts to access the parking spot 1110.

In another illustrative embodiment, the parking spot 1110 may also correspond with secure access location as discussed throughout the disclosure, including the method discussed with FIG. 10. In some examples, the user device 1102 may receive a token that can be used with a cryptographic hash function to access the secure area associated with a parking spot 1110 (e.g., by digitally signing a credential, providing the digital signature to an access point unit associated with the parking spot 1110, and gaining access to the secure area associated with the parking spot 1110, etc.).

At step 1120, the user device 1102 may access a network document provided by the remote server 1106 to request a reservation to use the parking spot 1110. The user device 1102 may provide a first request to access the parking spot 1110. The first request may comprise a start time, an end time, an identification of the location, an identification of the vehicle or user device 1102, and/or payment information associated with accessing the parking spot 1110.

At step 1124, the remote server 1106 may store data from the first request (e.g., the start time, end time, identification of the location, and/or identification of the vehicle or user device 1102) in a data store 1108. In some examples, the remote server 1106 may fetch a stored access token that corresponds with the parking spot 1110 and/or user device 1102.

At step 1130, the remote server 1106 may transmit a confirmation to a parking device 1104. The parking device 1104 may be a computing device with a processor and memory that is located within approximate distance of the parking spot 1110 to identify whether the parking spot has been reserved. A parking enforcement officer may access the parking device 1104 to access this information as well. In some examples, data stored at the parking device 1104 may be stored remotely in a network document also accessible by the parking enforcement officer.

At step 1134, the remote server 1106 may transmit a token to the user device 1102 to confirm the reservation to access the parking spot 1110 between the start time and end time. In some examples, the remote server 1106 may transmit a token that the user device 1102 may use to digitally sign a second request to access the parking spot 1110. In some examples, the second request may be transmitted to the parking device 1104.

At step 1136, the user device 1102 may access the parking spot 1110 at a particular time. At the particular time, the parking enforcement officer may confirm that use of the parking spot 1110 is permitted by confirming the reservation of the parking spot 1110 at the parking device 1104 or confirming the reservation at the network document provided by the remote server 1106. The particular time may be compared with the start time and the end time from the first request to confirm that access is permitted.

Figure 12:
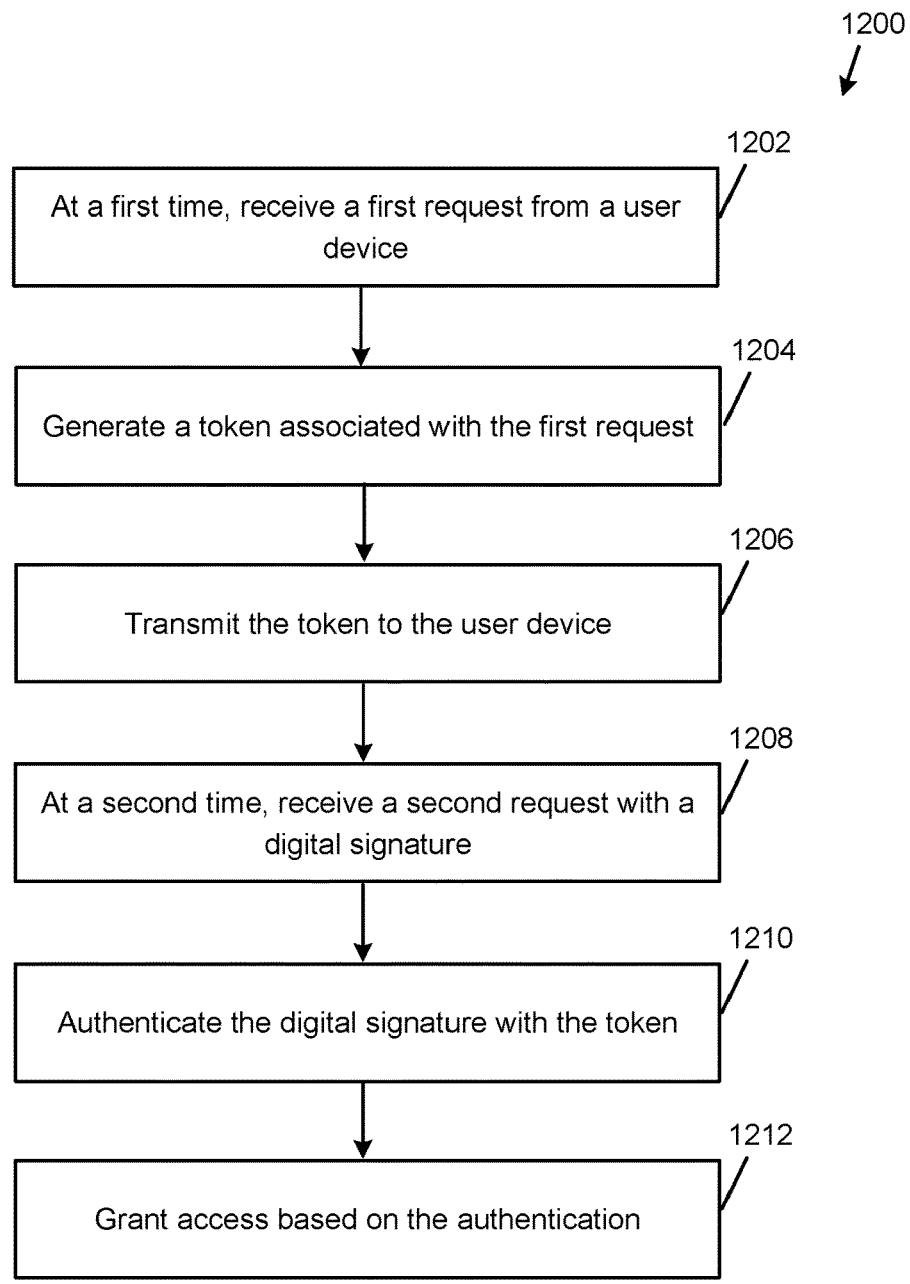
FIG. 12 illustrates an example flow diagram for granting access to location, according to an embodiment of the disclosure.

FIG. 12 illustrates an example flow diagram for granting access to location, according to an embodiment of the disclosure. The process 1200 is illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be omitted or combined in any order and/or in parallel to implement this process and any other processes described herein.

Some or all of the process 1200 (or any other processes described herein, or variations and/or combinations thereof) may be performed under the control of one or more computer systems configured with executable instructions and may be implemented as code (e.g., executable instructions, one or more computer programs or one or more applications). In accordance with at least one embodiment, the process 1200 of FIG. 12 may be performed by at least the one or more of the computing devices illustrated in FIGS. 2-6. The code may be stored on a computer-readable storage medium, for example, in the form of a computer program including a plurality of instructions executable by one or more processors. The computer-readable storage medium may be non-transitory.

Process 1200 may begin at 1202, when the method 120 compress receiving, at a computing device (e.g., a remote server, etc.), a first request to obtain access to a location during a time range with an end time. For example, the first request may comprise a digital signature from a user device. The first request may be received at a first time.

At 1204, the method 1200 may comprise generating and storing a token associated with the digital signature in a data store of the computing device. For example, the token may be generated and stored based at least in part on the first request.

At 1206, the method 1200 may comprise transmitting, by the computing device, the token to the user device. For example, the user device may receive the token from the computing device. The user device may be enabled to generate the digital signature using the token, for example, using a hash function.

At 1208, the method 1200 may comprise, at a second time, receiving a second request to obtain access to the location. For example, the computing device may receive a second request from an access control unit associated with a door or parking spot. The access to the location may correspond with the second time and the second request comprising the digital signature from the user device.

At 1210, the method 1200 may comprise authenticating the digital signature based at least in part on a comparison between the stored token and the received digital signature.

At 1212, the method 1200 may comprise granting access based at least in part on the authentication. For example, the authentication may be based at least in part on the second time being within the time range identified in the first request and a successful authentication of the digital signature. The access may be granted between the second time and the end time identified in the first request.

Figure 13:
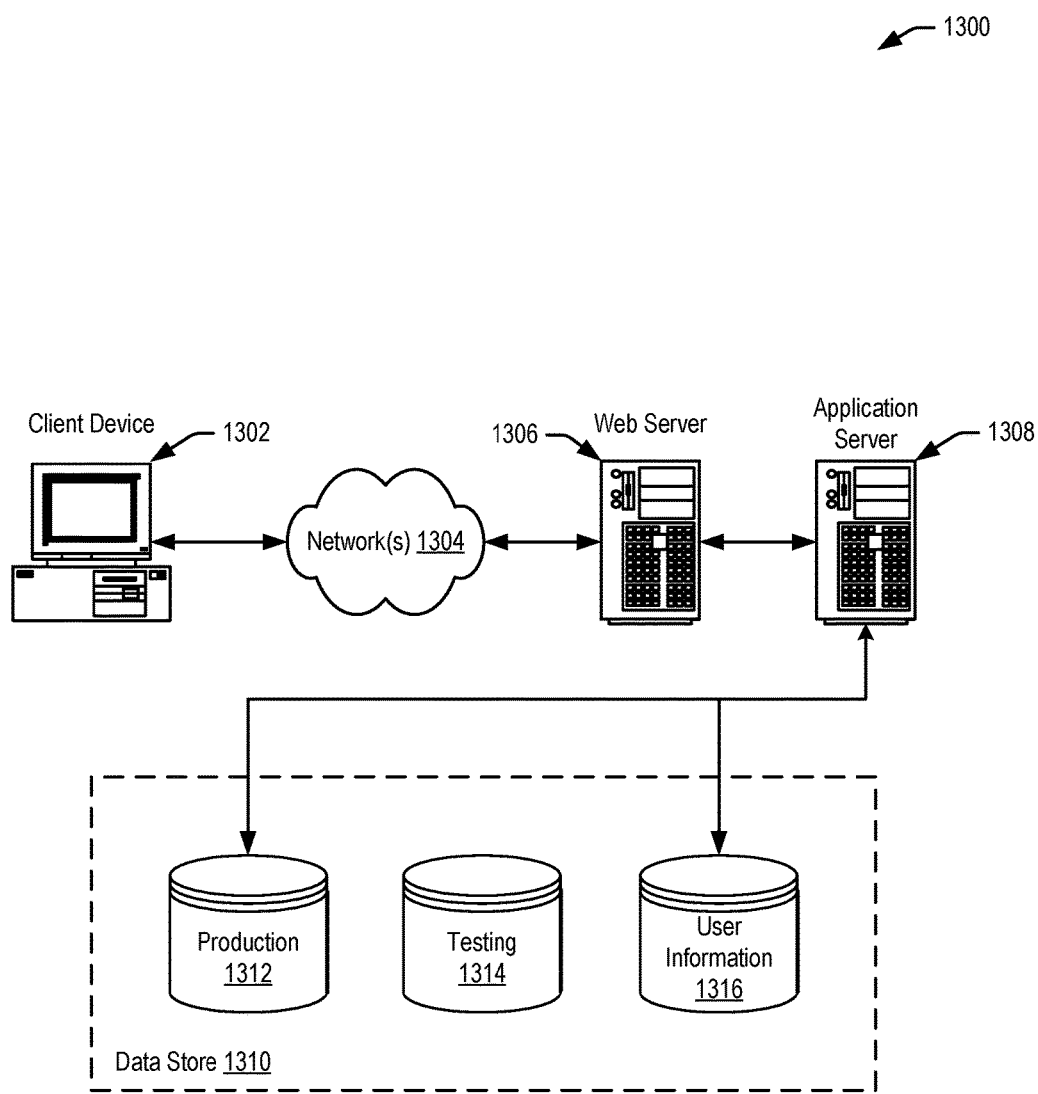
FIG. 13 illustrates an example environment in which various embodiments can be implemented.

FIG. 13 illustrates aspects of an example environment 1300 for implementing aspects in accordance with various embodiments. As will be appreciated, although a Web-based environment is used for purposes of explanation, different environments may be used, as appropriate, to implement various embodiments. The environment includes an electronic client device 1302, which can include any appropriate device operable to send and receive requests, messages, or information over an appropriate network 1304 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1306 for receiving requests and serving content in response thereto, although for other networks an alternative device serving a similar purpose could be used as would be apparent to one of ordinary skill in the art.

The illustrative environment includes at least one application server 1308 and a data store 1310. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 1302 and the application server 1308, can be handled by the Web server. It should be understood that the Web and application servers are not required and are merely example components, as structured code discussed herein can be executed on any appropriate device or host machine as discussed elsewhere herein.

The data store 1310 can include several separate data tables, databases or other data storage mechanisms and media for storing data relating to a particular aspect. For example, the data store illustrated includes mechanisms for storing production data 1312 and user information 1316, which can be used to serve content for the production side. The data store also is shown to include a mechanism for storing log data 1314, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 1310. The data store 1310 is operable, through logic associated therewith, to receive instructions from the application server 1308 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 1302. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 13. Thus, the depiction of the system 1300 in FIG. 13 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:

receiving, at a computing device, a first request to obtain access to a location during a time range with an end time, the first request comprising a digital signature from a user device, the first request received at a first time;

generating and storing a token associated with the digital signature in a data store of the computing device based at least in part on the first request;

transmitting, by the computing device, the token to the user device, the user device enabled to generate the digital signature using the token;

at a second time, receiving a second request to obtain access to the location, the access to the location corresponding with the second time, the digital signature generated by the user device in association with the second time, and the second request comprising the digital signature from the user device;

authenticating the digital signature based at least in part on a comparison using the stored token and the digital signature; and based at least in part on the second time being within the time range identified in the first request and a successful authentication of the digital signature, granting physical access to the location for the user device, the access granted between the second time and the end time identified in the first request.

2. The computer-implemented method of claim 1, wherein the second request is received from an access control unit that interacts with the user device prior to receiving the second request at the computing device.

3. The computer-implemented method of claim 1, wherein the token stored at the user device is not transmitted to the computing device.

4. The computer-implemented method of claim 1, further comprising:
   determining that the user device has been compromised; and
   deleting the stored token from the data store.

5. The computer-implemented method of claim 1, further comprising:
   determining that the user device has been compromised; and
   tagging the stored token at the data store without deleting the stored token.

6. A non-transitory computer-readable storage medium storing computer-executable instructions that, when executed by a computer system, configure the computer system to perform operations comprising:
   at a first time, receive a first request to obtain access to a location, the first request comprising a digital signature from a user device, and the first request corresponding with a time range with an end time of permissible access to the location;
   generate and store a token associated with the digital signature in a data store based at least in part on the first request;
   transmit the token to the user device, the user device enabled to generate the digital signature using the token;
   at a second time, receive a second request to obtain access to the location, the access to the location corresponding with the second time, the digital signature being generated by the user device in association with the second time, and the second request comprising the digital signature from the user device:
   enable an authentication of the digital signature based at least in part on a comparison using the stored token and the digital signature in the first request; and
   based at least in part on the first time being within the time range and a successful authentication of the digital signature, grant access to the location for the user device during the time range, the access granted between the second time and the end time identified in the first request.

7. The computer-readable storage medium of claim 6, wherein the user device transmits the digital signature to an access control unit via a first communication protocol, wherein the first request or the second request is transmitted via a second communication protocol, and wherein the first communication protocol and the second communication protocol are different.

8. The computer-readable storage medium of claim 6, wherein the first request is received from an access control unit via a third communication protocol after the user device interacts with the access control unit.

9. The computer-readable storage medium of claim 6, further comprising:
   prior to the first time, transmitting, to an access control system, authentication parameters associated with the user device, wherein the access control system is enabled to authenticate the digital signature of the user device; and
   after the first time, receiving, from the access control system, confirmation of the authentication of the user device.

10. The computer-readable storage medium of claim 6, wherein the location comprises a parking spot.

11. The computer-readable storage medium of claim 6, wherein the location comprises a building with an access control unit.

12. The computer-readable storage medium of claim 6, wherein the digital signature is device-specific.

13. The computer-readable storage medium of claim 6, further comprising:
   providing an identification of the location via a user interface;
   receiving an interaction with the user interface corresponding with the identification of the location; and
   transmitting the token to the user device, wherein the token is used to generate the digital signature to request access of the location.

14. The computer-readable storage medium of claim 13, wherein the time range is identified through interactions with the user interface.

15. The computer-readable storage medium of claim 13, wherein the token is stored in a secure element of the user device.

16. The computer-readable storage medium of claim 13, wherein the token is stored in an encrypted file format at the user device.

17. The computer-readable storage medium of claim 13, wherein the token is automatically transmitted to the user device based at least in part on initiating a transaction associated with the location.

18. A computing device comprising:
   a memory; and
   a processor coupled with the memory to perform a method comprising:
   at a first time, receiving a first request to obtain access to a location prior to an end time, the access associated with a user device;
   transmitting a token to the user device, the user device enabled to generate a digital signature using the token;
   at a second time, receiving a second request to obtain access to the location, and the second request comprising the digital signature from the user device;
   authenticating the digital signature based at least in part on a comparison using the transmitted token and the digital signature in the second request; and
   based at least in part on the second time being prior to the end time identified in the first request and a successful authentication of the digital signature, granting access to the location for the user device at the second time.

19. The computing device of claim 18, the method further comprising:
   transmitting a command to an access control unit associated with the location, wherein the command changes a state of the access control unit.

20. The computing device of claim 19, wherein a value of the token does not comprise the end time identified in the first request.

21. The computing device of claim 19, wherein the digital signature is generating by applying a hash function to the token at the user device.

22. The computing device of claim 19, the authentication of the digital signature further comprises: applying a hash function to the digital signature in the second request.

* * * * *

UNITED STATES PATENT AND TRADEMARK OFFICE
CERTIFICATE OF CORRECTION

PATENT NO. : 10,498,538 B2
APPLICATION NO. : 15/714956
DATED : December 3, 2019
INVENTOR(S) : Kaushik Mani et al.

Page 1 of 1

It is certified that error appears in the above-identified patent and that said Letters Patent is hereby corrected as shown below:

In the Claims

Column 27, Line 40, Claim 6:
Delete: "signature from the user device:"
Insert: --signature from the user device;--

Signed and Sealed this
Fourth Day of February, 2020

Andrei Iancu
*Director of the United States Patent and Trademark Office*